(12) United States Patent
Young et al.

(10) Patent No.: US 8,252,370 B1
(45) Date of Patent: Aug. 28, 2012

(54) CONTINUOUS HIGH-SPEED COATING OF FINELY GROUND PARTICULATES

(75) Inventors: Ming-Wan Young, Basking Ridge, NJ (US); Costas George Gogos, Wyckoff, NJ (US); Jun Yang, Kearny, NJ (US); Rajesh Dave, Short Hills, NJ (US); Linje Zhu, Newark, NJ (US); Peter Bonnett, Succasunna, NJ (US); William Schepige, West Orange, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 1274 days.

(21) Appl. No.: 11/457,501

(22) Filed: Jul. 14, 2006

Related U.S. Application Data

(60) Provisional application No. 60/596,777, filed on Oct. 20, 2005.

(51) Int. Cl.
*B05D 1/24* (2006.01)
(52) U.S. Cl. ........ 427/212; 427/213; 428/403; 428/407; 430/106; 430/108; 430/137
(58) Field of Classification Search .................. 428/403, 428/407; 430/106, 108, 137; 427/212, 213
See application file for complete search history.

(56) References Cited

U.S. PATENT DOCUMENTS

| 5,512,403 | A | * | 4/1996 | Tyagi et al. | ............... | 430/111.33 |
| 6,004,717 | A | * | 12/1999 | Creatura et al. | ......... | 430/137.13 |
| 6,197,369 | B1 | * | 3/2001 | Watano et al. | ................ | 427/213 |

* cited by examiner

*Primary Examiner* — Leszek Kiliman
(74) *Attorney, Agent, or Firm* — Henry S. Goldfine

(57) ABSTRACT

A method for the continuous production of finely ground particulates coated with a barrier, or other desirable film wherein the coated particulates exhibit a diameter of less than 10 microns. In an exemplary embodiment, large coated particulates are introduced into a fluid energy, or jet mill, along with smaller, uncoated particulates. As the particulates collide within the mill they are comminuted, and an amount of coating is transferred from the coated particulates to the uncoated ones such that they become sufficiently coated and size-reduced to a desired size. Alternatively, uncoated particulates are milled and coated during their milling. Still alternatively, uncoated particulates are milled and subsequently directed through an atomized mist of coating material wherein the size of the mist droplets are as large, or larger than the directed particulates.

31 Claims, 4 Drawing Sheets

CONTINUOUS HIGH-SPEED COATING OF FINELY GROUND PARTICULATES

CROSS REFERENCE TO RELATED APPLICATION

This application claims the benefit under 35 USC 119(e) of U.S. Provisional Patent Application No. 60/596,777 filed Oct. 20, 2005, the entire file wrapper contents of which provisional application are herein incorporated by reference as though set forth at length.

UNITED STATES GOVERNMENT INTEREST

The inventions described herein may be manufactured, used and licensed by or for the U.S. Government for U.S. Government purposes.

FEDERAL RESEARCH STATEMENT

The invention described herein may be made, used, or licensed by or for the United States Government for government purposes without payment of any royalties thereon or therefore.

BACKGROUND OF INVENTION

1. Field of the Invention

This invention relates generally to the field of finely ground materials preparation and in particular how such processes combine with continuous methods for coating extremely-fine particulates with polymeric material or other coating materials.

2. Background of the Invention

Finely ground particulates are known to have widespread applicability in a number of industries including pharmaceuticals, cosmetics, industrial coatings and energetics (i.e., propellants, explosives). In a number of these applications, the particulates must be coated with certain other material(s) that impart desirable physical and/or mechanical and/or chemical characteristics to the particulates. Such particulate coatings include lubricants, barrier films, wetting agents, polymers and/or monomers.

One particularly important coated fine particulate is the extremely energetic, high explosive cyclotrimethylenetrinitramine (RDX). Finely ground RDX is currently being employed as an ingredient in new Insensitive Munition (IM) explosive formulations and as an energetic enhancer in propellant formulations. Coating these materials generally enhances processability, safety and shelf life.

Presently, super-fine, coated RDX is manufactured in a multi-step process which unfortunately exhibits a significant rework potential. Manufacturing methods that do not suffer from this rework infirmity would therefore represent a significant advance in the art and, in the particular case of energetics, the safety of the end product(s).

SUMMARY OF THE INVENTION

The present invention provides a continuous process for reducing the size of particulate materials and coating the size-reduced particulates with a barrier or other desirable film. The process continuously processes the particulates in a fluid-energy, or jet mill.

According to the present invention, relatively large, coated particles are introduced into the fluid-energy mill along with smaller, uncoated particles. As the particulates collide within the mill they are reduced in size and comminuted, and an amount of coating is transferred from the coated particulates to the uncoated ones such that they become sufficiently coated.

In an alternative embodiment of the present invention, relatively large uncoated particulates are introduced into the fluid-energy mill along with smaller uncoated particulates. During the milling operation, a coating material is introduced which coats the particulates. Subsequent polymerization and/or curing of the coating overlying the particulates may be initiated or catalyzed through the effect of a wide-variety of known mechanisms including, but not limited to, ultraviolet radiation, heat, and time-dependent curing.

Although the types of fluid-energy and/or jet mills employed are well known and readily available, their particular utility for simultaneously producing ultra-fine, coated particles—and in particular ultra-fine, coated, energetic compositions—was not previously recognized. Furthermore—and due in part to the extreme difficulty to produce atomized coating materials in sizes smaller than ten (10) microns—consistently coating particles of that small size was equally difficult. Finally, coating particles on the order of one (1) micron in size—prior to the present invention—was unknown.

BRIEF DESCRIPTION OF THE DRAWING

Various features and advantages of the present invention and the manner of attaining them will be described in greater detail with reference to the following description, claims and drawing wherein:

DETAILED DESCRIPTION

The following merely illustrates the principles of the invention. It will thus be appreciated that those skilled in the art will be able to devise various arrangements which, although not explicitly described or shown herein, embody the principles of the invention and are included within its spirit and scope.

Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

Figure 1:
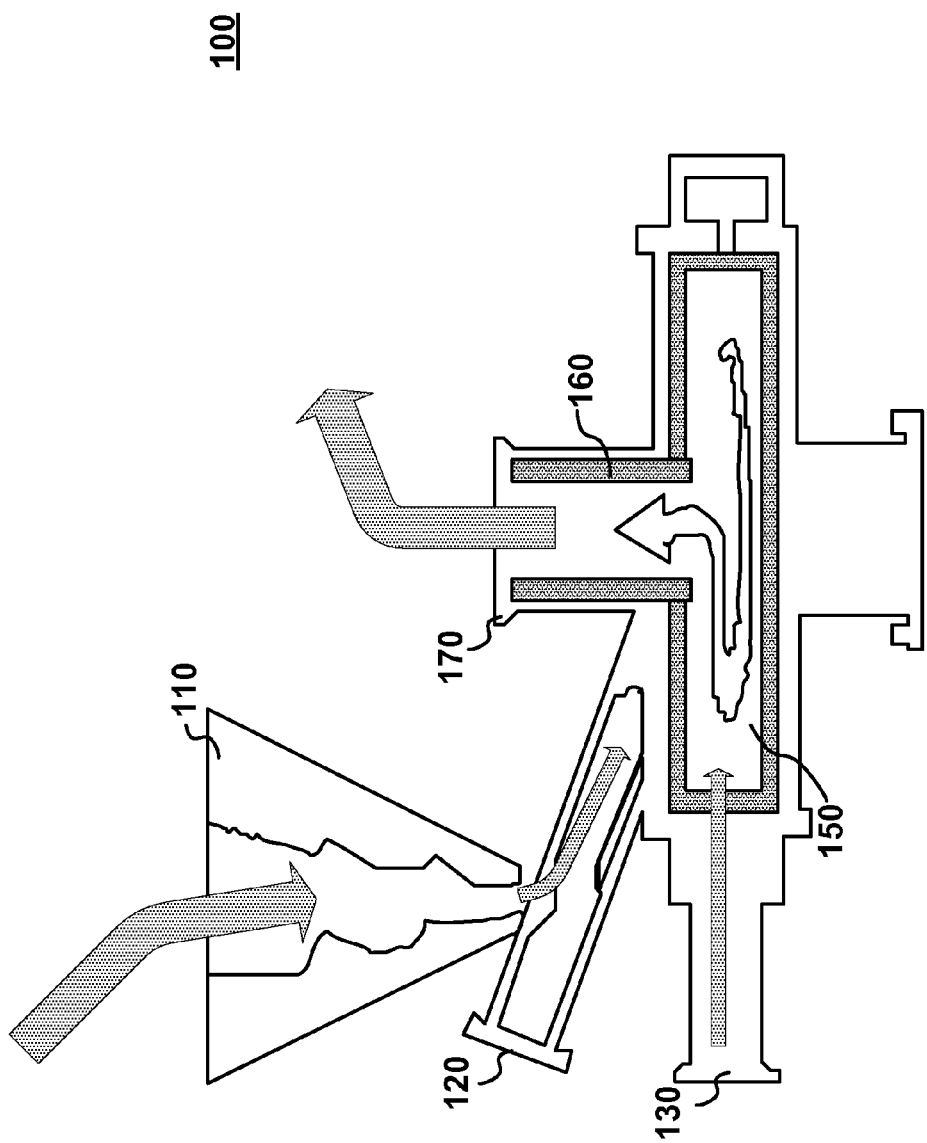
FIG. 1 is a sectional illustration of a MICRONIZER® mill suitable for use in the present invention.

FIG. 1 is a sectional illustration of a widely known, MICRONIZER (Sturtevant Mill Corp.) fluid-energy or jet mill which is one class of mill employed in the present invention. With such mills, fluid energy is admitted in fine, high-velocity streams at an angle at the periphery of a grinding and classifying chamber. While different configurations of fluid-energy mills are known, what all have in common is that particle size reduction is achieved by particles colliding with other particles, as well as by collisions between the particles and grinding surfaces of the mill.

The mill illustrated in FIG. 1 is representative of a commercially available MICRONIZER mill manufactured by Sturtevant Inc., Hanover Mass. Operationally, particulate material is introduced via feed funnel 110 and subsequently directed into grinding chamber 150 through the effect of compressed feed air applied to feed air/gas inlet 120. Compressed grind air or gas, applied to grind air gas manifold 130, causes the introduced particulates to rotate about the grinding chamber. The rotational particulate flow generates high-speed collisions, creating increasing smaller particulates as a result of the particulate-on-particulate and particulate-to-wall impacts.

While not specifically shown in the illustration of FIG. 1, such a mill will normally have a number of feed inlets spaced around the periphery of the grinding chamber 150. Similarly, a series of air jets, which are supplied with air by the air manifold 130, are also spaced around the periphery of the grinding chamber. The air jets cause entering particulates to move in high speed rotation, so that they violently impact each other and with the wall.

As a further result of the rotation, larger particulates—due to centrifugal forces—are kept at the periphery of the grinding chamber, where most of the grinding occurs. Smaller particulates—due to centripetal forces—are driven toward the center of the grinding chamber where a centrally located outlet 170 permits their discharge.

As can be readily appreciated by those skilled in the art, mills such as that shown in FIG. 1 are relatively simple and generally contain no moving parts. In addition, they provide an efficient, one-step grinding and classifying operation, which advantageously lends itself to the present invention.

As noted, one particularly important application for the present invention is the preparation of energetic materials (such as the high explosive composition RDX) coated with one or more of a variety of coating materials. By way of example only, the types of coating materials may be broadly categorized as follows.

Solid Coating Materials: Waxes exhibiting various sizes and melting points and fumed silica;

Solvent-Borne Coating Materials: di-octyl adipate (DOA), polyisobutylene (PIB), Estane, etc;

Non-Reactive Organic Liquids: oils, lubricants, and plasticizers; and

Monomeric and Pre-Polymeric Coating Materials: including heat curable compositions, UV curable compositions as well as smooth coat monomers and pre-polymer solutions.

As will become apparent to those skilled in the art, the present method is advantageously compatible with these enumerated coating materials (and others) and accommodates the nearly instantaneous curing of applied coatings via ultraviolet (UV) mechanisms or longer cure times associated with solvent flash-off or chemically induced polymerization.

Figure 2:
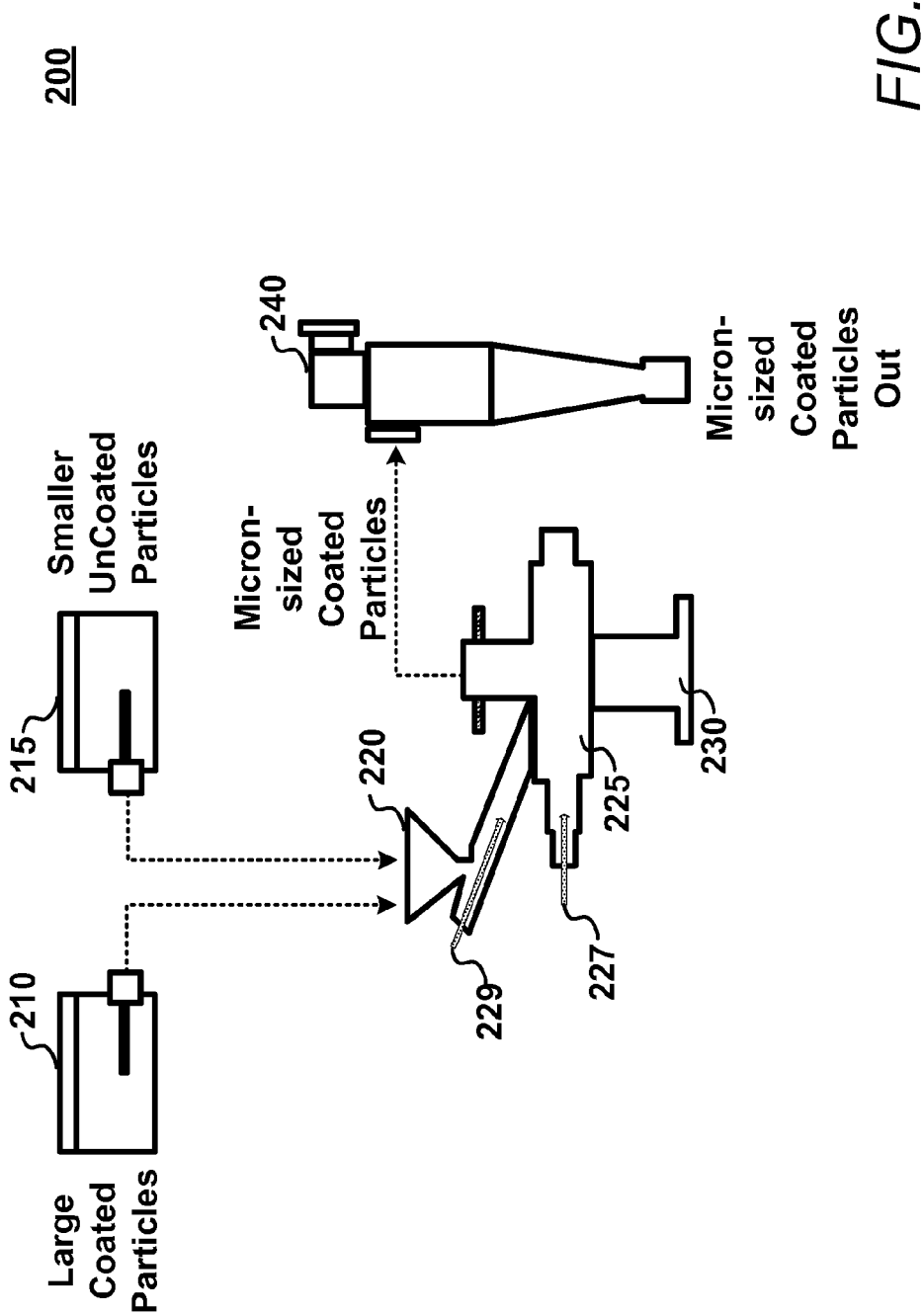
FIG. 2 is a schematic illustration of equipment suitable for carrying out the process of the present invention in-situ.
Figure 3:
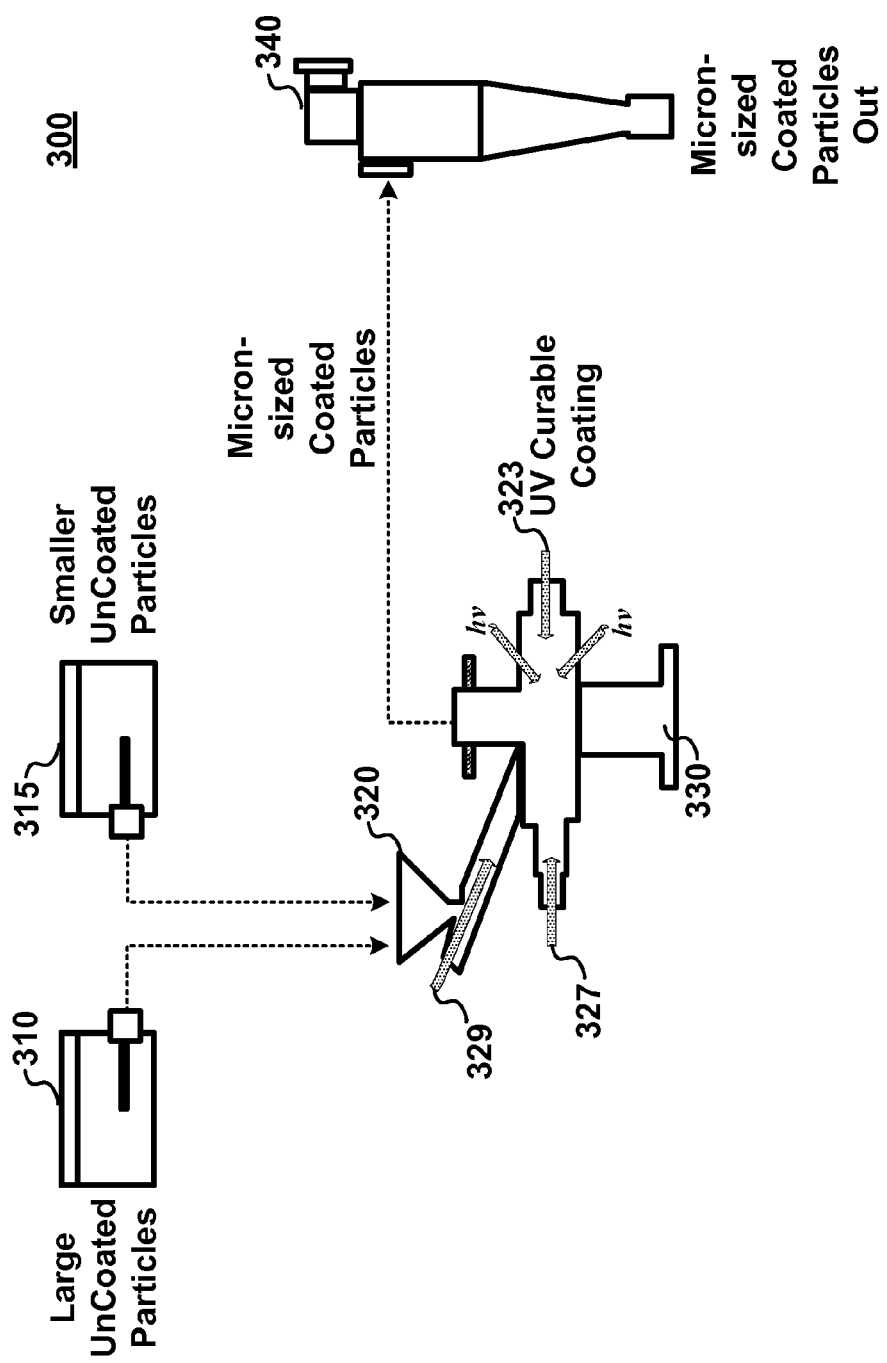
FIG. 3 is a schematic illustration of equipment suitable for carrying out an alternative process of the present invention in-situ.
Figure 4:
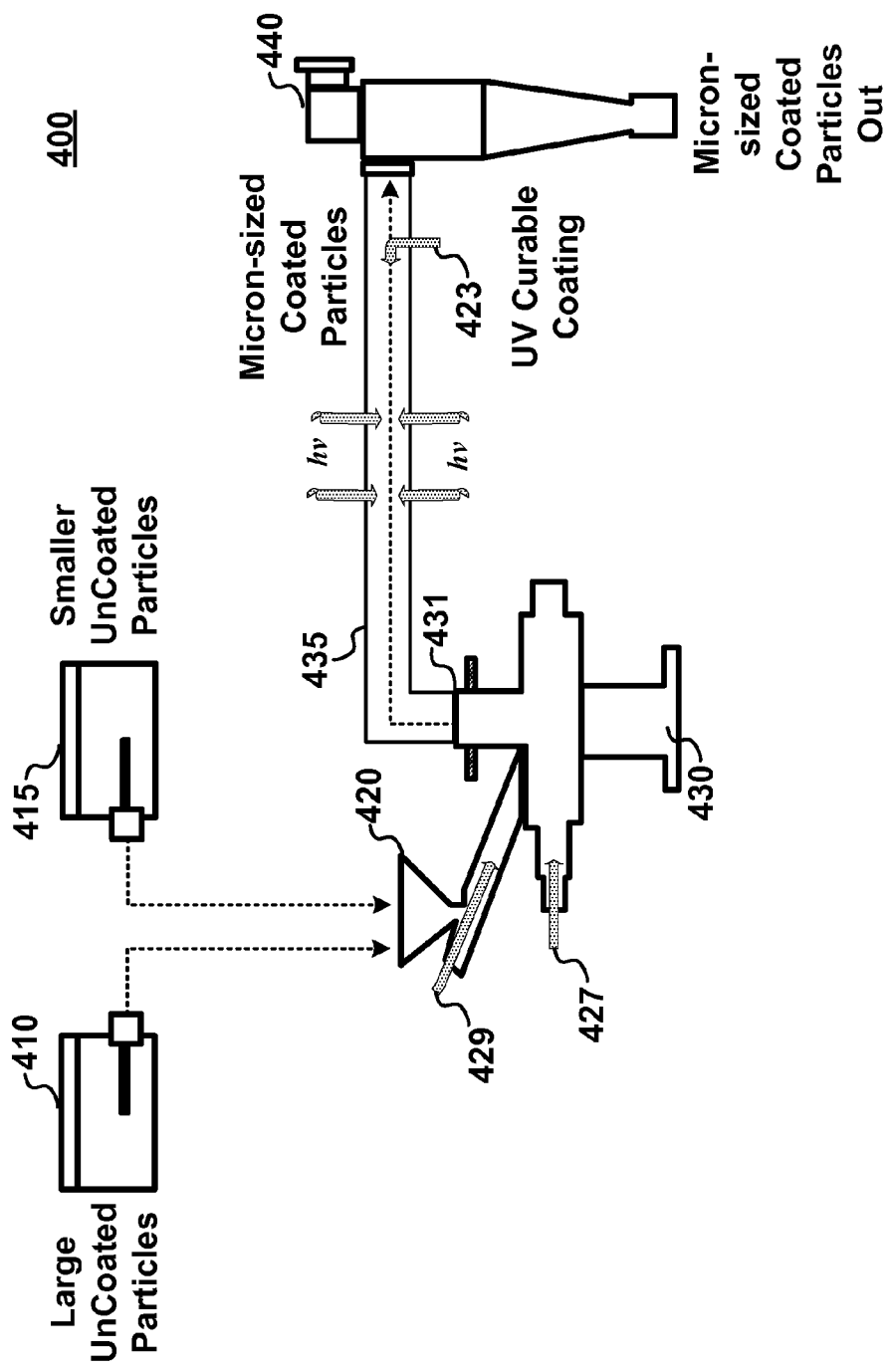
FIG. 4 is a schematic illustration of equipment suitable for carrying out another alternative process of the present invention.

FIG. 2 illustrates an arrangement of equipment suitable for carrying out the present invention wherein the milling and coating proceed simultaneously inside the FEM grinding chamber (in-situ). Large, coated particulates 210 and smaller, uncoated particulates 215 are fed into feed funnel 220 of fluid energy mill 225. The particulates are directed into grinding chamber 225 through the effect of feed air applied at feed air input 229. Compressed grind air applied through grind air manifold 227, causes particulates to violently circulate around grinding chamber 225.

While in the grinding chamber 225, the flow induced centrifugal forces assist the transfer of coating material from the larger, pre-coated particulates to the smaller uncoated ones as the particulates undergo milling and the resultant size reduction in size. Advantageously, the present method may produce coated particulates <10 microns in size—including those on the order of one (1) micron in size.

Of further advantage, while we have described this exemplary process using both coated and uncoated particulates, the present method will operate if only coated particulates are provided to feed funnel 220. In either case, as the pre-coated particulates are circulated within the FEM, they collide with the chamber walls and other pre-coated particulates and smaller uncoated ones. During the collisions between the pre-coated and uncoated particulates, some of the coating material is transferred to or adsorbed by the uncoated particulates, thereby coating the uncoated particulates while simultaneously reducing the particulate size to that desired.

Once desired particulate size(s) are so produced, they are urged to the central region of the grinding chamber 225 and discharged to a collector 240 for storage and subsequent dispensation.

As can now be readily appreciated by those skilled in the art, the present invention advantageously employs the relatively high inherent kinetic energy associated with the milling process to transfer the coating material from the larger, coated particulates to smaller uncoated ones. Of particular significance, the coating does not agglomerate during the coating transfer. For particular groups of coating materials, the frequent, violent particulate collisions which occur during milling within the FEM facilitates the transfer of the coating materials from the coated surfaces to any fresh surfaces resulting from particulate attrition.

FIG. 3 shows an alternative arrangement for carrying out the present invention in-situ wherein only un-coated particulates 310, 315 are introduced into the FEM 330. During milling, a coating material—for example a UV curable coating—is introduced into the grinding chamber and subsequently transferred to the particulates as described before. The introduction of sufficient energy, i.e., UV radiation into the grinding chamber cures the coating on the surface of the particulates. Any particulates exiting the FEM are coated and correctly sized for storage in collector 340.

From these examples, those skilled into the art will readily appreciate that the present invention may continuously produce coated particulates of a desired size, without further processing or re-work (other than packaging for storage/transport).

An additional example of the present method is shown in FIG. 4. Shown therein are relatively large, uncoated particulates (~20-200 microns) 410, fed into FEM input funnel 420. As with the earlier examples, the particulates so introduced into the FEM 430 are milled to a desired size.

As the properly sized particles are discharged from the FEM they are directed to a collector 440 via transfer duct 435 wherein they are sprayed with a desired coating material 423, finely atomized into the particle stream flowing through transfer duct 435 from FEM discharge port to collector 440. Although the finely atomized coating droplets may be larger than the milled particulates comprising the flowing particle stream, the milled particulates may be transferred through the duct at a sufficient high velocity to impart enough momentum to the particulates such that they penetrate the droplet(s) and become coated. The coated particulates may then flow through a portion of the transfer duct 435 wherein the coating may be cured on the surface of the particulates.

As before, any of a number of mechanisms may be employed (i.e., UV irradiation) to promote the cure of the coating during the transfer to the collector 440. It should be noted that while we have used the term "cure" to describe the permanent affixation of the coating to the particulates, it is understood that such "cure" may include polymerization, solvent flash-off, catalysis, or other known mechanisms Finally, and as can be appreciated, this exemplary embodiment of the present invention uses the velocity of the flowing particulates to penetrate the atomized coating droplets, thereby transferring the coating to the surface of the particulates.

Of course, it will be understood by those skilled in the art that the foregoing is merely illustrative of the principles of this invention, and that various modifications can be made by those skilled in the art without departing from the scope and spirit of the invention. In particular, different FEM configurations may be employed or configurations wherein high-velocity jets of particulates are directed directly at one another to produce collisions of sufficient energy to impart a size reduction and coating. Additionally, the coatings may advantageously be applied dry, as liquids, or some combination as directed by the particular application. Furthermore, the applied coatings may advantageously be a mixture of various individual coatings in a variety of proportions. Finally, the particular particulates used may also be a mixture of various individual particulate types in any desired proportion. For example, a mixture of various particulate energetic materials such as HDX, RDX, etc. As can be readily appreciated by those skilled in the art, the invention of the present application may simultaneously mill and coat a mixture of particulates, depending upon the desired final end product. Accordingly, our invention is to be limited only by the scope of the claims attached hereto.

What is claimed is:
1. A method for the production of finely ground, coated particulates comprising the steps of:
   introducing both coated and uncoated particulates into a fluid energy mill;
   milling both coated and uncoated particles together within the fluid energy mill by particles colliding with other particles as well as by collisions between the particles and surfaces within the fluid energy mill to provide milled particulates all having a desired reduced size compared to the introduced particulates; and
   transferring a quantity of the coating from the coated particulates to the uncoated particulates coincident with the milling of both coated and uncoated particles together to produce particles that are all coated and all have the desired size.
2. The method according to claim 1 further comprising the additional step of:
   discharging, from the fluid energy mill, coated particulates of the desired size as a uniform coated particulate output.
3. The method according to claim 2, further comprising the steps of:
   curing the coating adhering to the surface of the coated particulates.
4. The method according to claim 1 wherein the desired size of the particulates is ≦(less than or equal to) 10 microns in diameter.

5. The method according to claim 1, wherein said coated particulates are substantially larger than said uncoated particulates.
6. The method according to claim 3 wherein said curing step further comprises the steps of:
   applying a quantity of ultra violet radiation (UV) to the coating.
7. The method according to claim 6 wherein said curing step further comprises the steps of:
   applying a quantity of heat to the coating.
8. The method according to claim 1 wherein said uncoated particulates comprise an energetic composition.
9. The method according to claim 8 wherein said energetic composition comprises RDX.
10. The method according to claim 1 wherein said coating comprises a polymer.
11. A method for producing ultra-fine, coated particulates comprising the steps of
   introducing particulates to be coated into a fluid energy mill; the particulates comprising both uncoated particles and coated particles;
   milling the particulates to a desired size that is less than or equal to 10 microns in diameter; and
   applying a quantity of a coating material to the particulates during at least a portion of the milling so that all particles are coated and have the desired size.
12. The method according to claim 11, further comprising the steps of:
   curing the coating applied to the surface of the particulates.
13. The method according to claim 12 further comprising the steps of:
   discharging, from the fluid energy mill, coated particulates of the desired size.
14. The method according to claim 12 wherein said curing step further comprises the steps of:
   applying a quantity of ultra violet radiation (UV) to the coating.
15. The method according to claim 11 wherein said curing step further comprises the steps of:
   applying a quantity of heat to the coating.
16. The method according to claim 11 wherein said particulates comprise an energetic composition.
17. The method according to claim 16 wherein said energetic composition comprises RDX.
18. The method according to claim 11 wherein said coating comprises a polymeric material.
19. The method according to claim 11 wherein said introduced particulates comprise a mixture of particulates having a plurality of compositions.
20. The method according to claim 11 wherein said coating comprises a mixture of individual coatings.
21. An ultra-fine, coated particulate production method comprising the steps of:
   introducing particulates to be coated into a fluid energy mill (FEM);
   milling the particulates to a desired uniform size less than the introduced particulates;
   discharging, from the FEM, particulates of the desired size; and
   directing the discharged particulates through an atomized mist of a coating material such that the coating material effectively uniformly coats all of the directed particulates.
22. The method according to claim 21, further comprising the steps of:
   curing the coating applied to the surface of the particulates.

23. The method according to claim 21 wherein said atomized mist comprises a plurality of droplets, said droplets being at least as large as the directed particulates.

24. The method according to claim 21 wherein the desired size of the particulates is (less than or equal to) 10 microns in diameter.

25. The method according to claim 22 wherein said curing step further comprises the steps of:
applying a quantity of ultra violet radiation (UV) to the coating.

26. The method according to claim 25 wherein said curing step further comprises the steps of:
applying a quantity of heat to the coating.

27. The method according to claim 21 wherein said particulates comprise an energetic composition.

28. The method according to claim 27 wherein said energetic composition comprises RDX.

29. The method according to claim 21 wherein said coating comprises a polymeric material.

30. The method of claim 21 wherein said introduced particulates comprise a mixture of particulates of more than one composition.

31. The method of claim 21 wherein said coating comprises a mixture of individual coating compositions.

* * * * *